US009301331B2

(12) United States Patent
Goldhofer et al.

(10) Patent No.: US 9,301,331 B2
(45) Date of Patent: Mar. 29, 2016

(54) MOBILE RADIO COMMUNICATION DEVICES, MOBILE RADIO COMMUNICATION NETWORKS, AND METHODS FOR CONTROLLING THE SAME

(71) Applicant: Intel IP Corporation, Santa Clara, CA (US)

(72) Inventors: Franz Goldhofer, Schaftlach (DE); Dirk Nickisch, Oberpframmern (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/025,901

(22) Filed: Sep. 13, 2013

(65) Prior Publication Data
US 2015/0079971 A1  Mar. 19, 2015

(51) Int. Cl.
H04W 4/00 (2009.01)
H04W 76/02 (2009.01)
H04W 48/20 (2009.01)

(52) U.S. Cl.
CPC ............ H04W 76/028 (2013.01); H04W 48/20 (2013.01)

(58) Field of Classification Search
CPC ............................ H04W 76/028; H04W 48/20
USPC ........................ 455/422.1; 370/338
See application file for complete search history.

(56) References Cited

U.S. PATENT DOCUMENTS

| 6,856,805 B1* | 2/2005 | Raaf | H04W 72/0413 370/331 |
| 2003/0040311 A1* | 2/2003 | Choi | 455/434 |
| 2007/0197246 A1* | 8/2007 | Julian | 455/515 |
| 2011/0080825 A1* | 4/2011 | Dimou et al. | 370/216 |
| 2011/0294508 A1* | 12/2011 | Min et al. | 455/436 |
| 2012/0100859 A1* | 4/2012 | Han et al. | 455/437 |
| 2012/0300811 A1* | 11/2012 | Hu | 375/133 |

OTHER PUBLICATIONS

3GPP TS 36.331, V10.5.0 2012-03 (release 10); LTE; Evolved Universal Terrestrial Radio Access (E-ULTRA); Radio Resource Control (RRC); Protocol specification; sec. 5.3.7.1 and sec. 5.3.7.2.
3GPP TS 36.331, V10.5.0 2012-03 (release 10); LTE; Evolved Universal Terrestrial Radio Access (E-ULTRA); Radio Resource Control (RRC); Protocol specification; sec. 5.3.1.3.
3GPP TS 36.304, V10.5.0 2012-03 (release 10); LTE; Evolved Universal Terrestrial Radio Access (E-ULTRA); User Equipment (UE) procedures in idle mode; sec. 5.2.3.1.

* cited by examiner

Primary Examiner — Marcos Batista

(57) ABSTRACT

A mobile radio communication device is described configured to operate in a first communication state and in a second communication state. The mobile radio communication device includes: a transmitter configured to transmit data to a mobile radio communication network when the mobile radio communication device is in a first communication state in which the mobile radio communication device is in a connection with a cell of the mobile radio communication network; a memory configured to store information based on the transmitted data; a cell determination circuit configured to determine a cell of a mobile radio communication network as a connection candidate based on the stored information; and a connection request circuit configured to request connection with the determined cell when the mobile radio communication device is in a second communication state in which the mobile radio communication device seeks a connection with a cell of a mobile radio communication network.

22 Claims, 9 Drawing Sheets

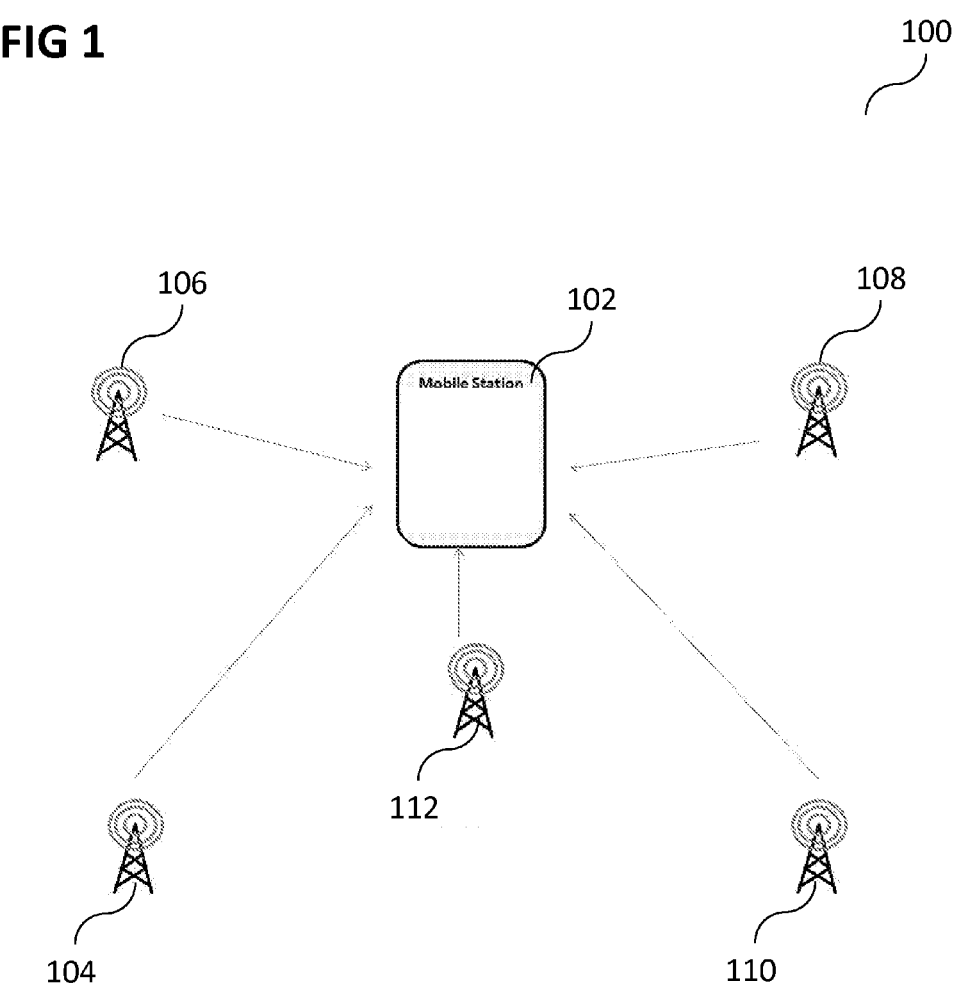

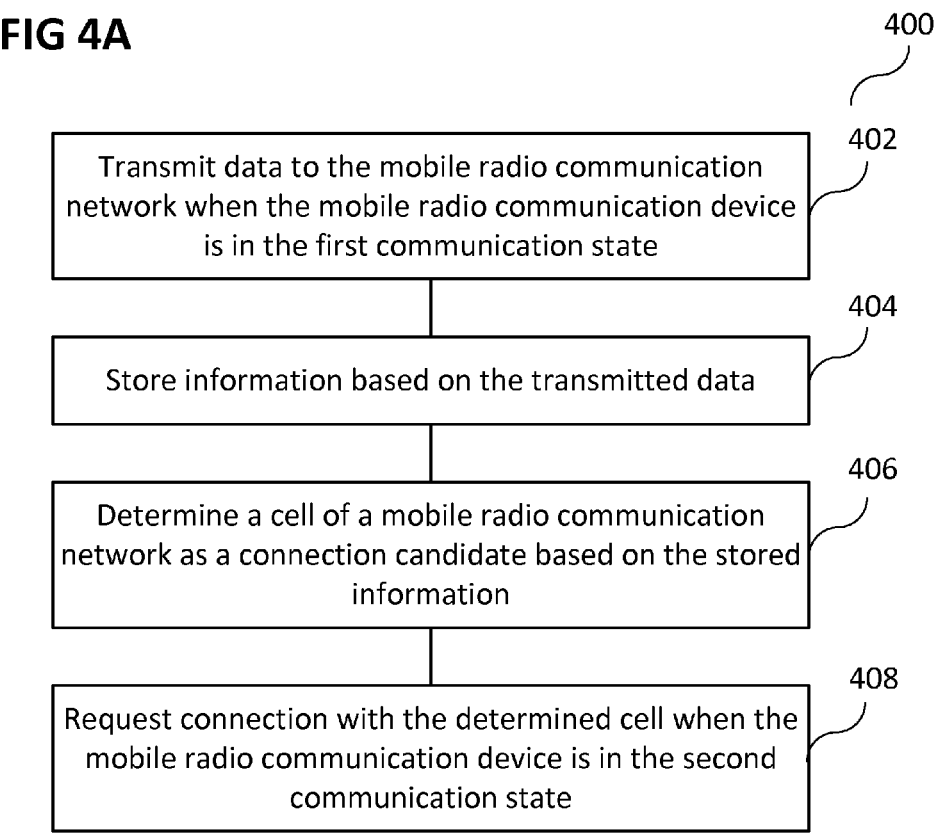
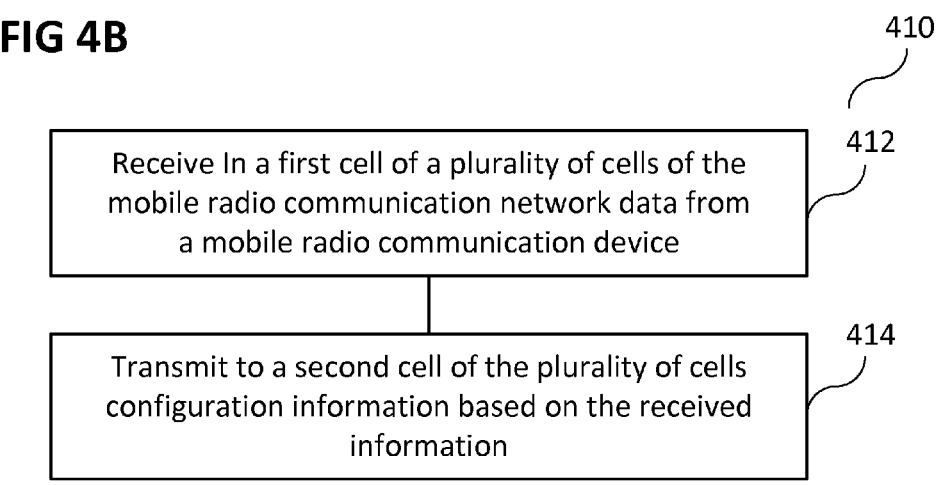

MOBILE RADIO COMMUNICATION DEVICES, MOBILE RADIO COMMUNICATION NETWORKS, AND METHODS FOR CONTROLLING THE SAME

TECHNICAL FIELD

The present disclosure generally relates to mobile radio communication devices, methods for controlling a mobile radio communication device, mobile radio communication networks, and methods for controlling a mobile radio communication network.

BACKGROUND

A mobile station (or user equipment; UE) that is connected to an EUTRAN (Evolved Universal Terrestrial Radio Access Network) base station, for example for user data reception or transmission, may lose this connection for several reasons. The UE might detect a radio link failure, handover or reconfiguration might fail or an integrity check fails. In all failed cases listed above the mobile station may desire to perform a reestablishment Procedure trying to reconnect. The UE may perform this reestablishment on the old serving cell that the UE was connected to or even on a different cell. This includes cells on same EUTRA frequency or different EUTRA frequency. For this reestablishment procedure, the UE may synchronize on the cell and send an RRC Connection Reestablishment Request message to the base station trying to reestablish the connection. This procedure may be cumbersome, and it may be desired to get a connection with the base station with a limited number of tries. Thus, there may be a need for devices and methods that provide an efficient Reestablishment Procedure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows a mobile radio communication network, in which various devices and methods according to various aspects may be used.

FIG. 4A shows a flow diagram illustrating a method for controlling a mobile radio communication device.

FIG. 4B shows a flow diagram illustrating alternative method for controlling a mobile radio communication network.

DESCRIPTION OF EMBODIMENTS

Figure 2A:
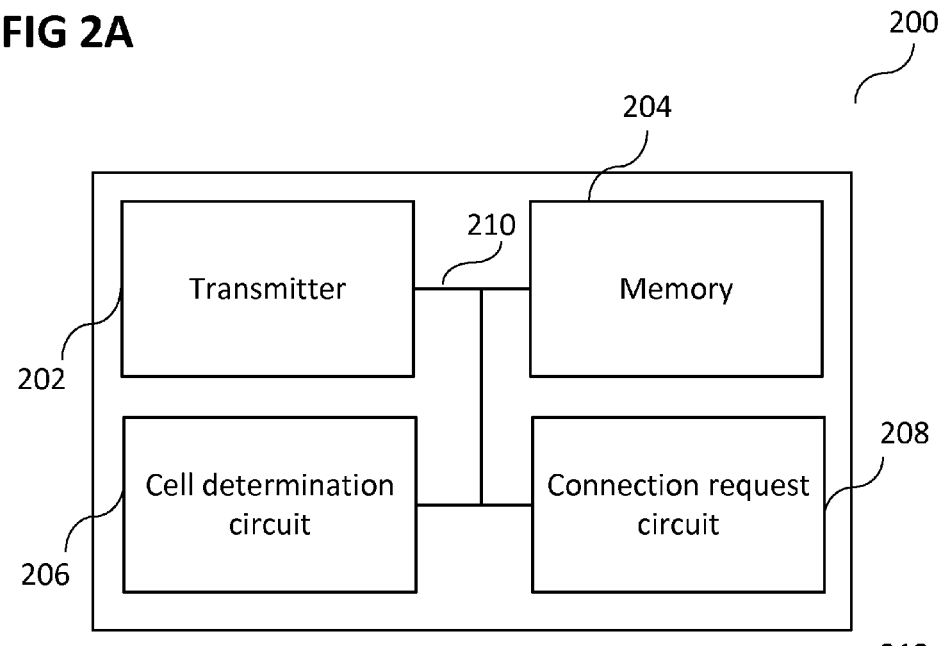
FIG. 2A shows a mobile radio communication device with a transmitter, a memory, a cell determination circuit, and a connection request circuit.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The terms "coupling" or "connection" are intended to include a direct "coupling" or direct "connection" as well as an indirect "coupling" or indirect "connection", respectively.

The words "exemplary" or "example" or "for example" are used herein to mean "serving as an example, instance, or illustration". Any aspect of this disclosure or design described herein as "exemplary" is not necessarily to be construed as preferred or advantageous over other aspect of this disclosure or designs.

A mobile radio communication device (which may also be referred to as end device) as referred to herein may be a device configured for wireless communication, for example a mobile phone, a desktop computer or a laptop. Furthermore, a mobile radio communication device may be an end-user mobile device (MD). A mobile radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The mobile radio communication device may include a memory which may for example be used in the processing carried out by the mobile radio communication device. The mobile radio communication network may include a memory which may for example be used in the processing carried out by the mobile radio communication network. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication network 100, in which various devices and methods according to various aspects may be used. For example, A mobile radio communication device 102, which may also be referred to as a mobile station or a user equipment (UE), may be in the coverage area of a plurality of radio base stations, each radio base station (or short: base station) supporting one or more cells. For example, a first base station (or a first cell) 104, a second base station (or a second cell) 106, a third base station (or a third cell) 108, a fourth base station (or a fourth cell) 110, and fifth base station (or a fifth cell) 112 may be provided. A base station may for example be an EUTRAN (Evolved Universal Terrestrial Radio Access Network) base station, but may also be any other kind of base station configured to communication with a mobile radio communication device.

A mobile station (UE), that is connected to the EUTRAN base station, for example for user data reception or transmission, may lose this connection for several reasons. The UE might detect a radio link failure, handover or reconfiguration might fail or an integrity check fails. In all failed cases listed above the mobile station may desire to perform a Reestablishment Procedure trying to reconnect. This reestablishment may be done on the old serving cell the UE was connected to or even on a different cell. This includes cells on same EUTRA frequency or different frequency. For this reestablishment procedure the UE may synchcronize on the cell and send a RRC (radio resource control) Connection Reestablishment Request message to the base station trying to reestablish the connection.

The Reestablishment may only succeed in case the target cell is prepared, i.e. the target cell has a valid UE context. In case the cell is not prepared with a valid UE context, the reestablishment procedure may fail and the connection between UE and network may be lost. A target cell may be 'prepared' if it got delivered the UE context from the source cell (and this may be a task or a step of the network, so that the UE may not know beforehand which base stations are prepared).

For performing this reestablishment procedure, the UE may have a network assigned time duration available. Only during this time duration, the UE may try to perform reestablishment. In case the reestablishment-trial does not succeed during the network given time frame (for example between 10 and 20 seconds), the UE may return to idle mode and the connection may finally be lost.

As of today's solutions, the UE performs a cell search and once a cell is found, the UE selects this cell and starts the reestablishment procedure. But the network may not have prepared this cell for reestablishment resulting in a non-successful reestablishment attempt. The UE may then be forced to go back to idle and to release the connection.

Today's solutions do not consider if a cell is prepared for reestablishment or not. On one hand, the UE may not exclude cells from reestablishment that are not probably prepared and there is also no prioritization among the cells which are good candidates for prepared cells. For the cell search procedure for reestablishment, the idle-cell-search procedure is reused, which just relies on signal strength and quality of all available cells, frequencies and bands. This procedure may be very slow and will probably choose not prepared cells.

In the GSM (Global System for Mobile Communications) network, the network may broadcast a bit, which tells the UE whether reestablishment is allowed on this cell. But this is a very static bit and cannot be changed quickly by the network. It is more to tell the UE that reestablishment is more or less not implemented in this cell or in the interface from network to the cell. Even if this bit tells the UE that reestablishment is allowed, it does not guarantee that the reestablishment will be successful, if for example the target cell does not have the context Currently, there is no mechanism in place for the UE to detect or to predict if a cell is or might be prepared for reestablishment. The UE will try to perform reestablishment only based on cells found during cell search procedure which may be based on received signal strength or signal quality and may be completely independent of the preparation-status of a cell. This may cause higher rates of failed reestablishment procedures and therefore also higher rate of drops of the connection.

According to various aspects of the present disclosures, devices and methods are provided for determining an order in which the cells should be searched for the purpose of reestablishment. This may both decrease the duration of the gap in the connection and reduce the probability of losing the connection completely.

Various devices and methods provide an optimized EUTRA Reestablishment Procedure.

FIG. 2A shows a mobile radio communication device 200. The mobile radio communication device 200 may be configured to operate in a first communication state and in a second communication state. In the first communication state, the mobile radio communication device 200 may be in a connection with a cell of a mobile radio communication network (not shown). In the second communication state, the mobile radio communication device 200 may seek a connection with a cell of a mobile radio communication network. The mobile radio communication device 200 may include a transmitter 202 configured to transmit data to the mobile radio communication network when the mobile radio communication device 200 is in the first communication state. The mobile radio communication device 200 may further include a memory 204 configured to store information based on the transmitted data. For example, the memory 204 may store the data when the mobile radio communication device 200 is in the first communication state. The memory 204 may furthermore store information about collected data (for example information about quality, about neighbors or about a reason why the mobile radio communication device 200 is seeking connection with a cell of the mobile radio communication network). For example, the memory 204 may store the data when the mobile radio communication device 200 is in the second communication state. For example, the memory 204 may store the data independent from the communication state of the mobile radio communication device 200. The mobile radio communication device 200 may further include a cell determination circuit 206 configured to determine (for example when the mobile radio communication device 200 is in the first communication state; for example when the mobile radio communication device 200 is in the second communication state; for example independent from the communication state of the mobile radio communication device 200) a cell of a mobile radio communication network as a connection candidate based on the stored information. The mobile radio communication device 200 may further include a connection request circuit 208 configured to request connection with the determined cell (for example to request a reestablishment of a (previous) connection) when the mobile radio communication device 200 is in the second communication state. The transmitter 202, the memory 204, the cell determination circuit 206, and the connection request circuit 208 may be coupled with each other, for example via a connection 210, for example an optical connection or an electrical connection, such as for example a cable or a computer bus or via any other suitable electrical connection to exchange electrical signals.

In other words, the mobile radio communication device 200 may determine a cell to which the mobile radio communication device 200 requests connection based on information sent from the mobile radio communication device 200 as long as a connection to a cell has still been active.

The first communication state may be a connected state.

The second communication state may be a connected state in which connection has been temporarily lost or an idle state.

The data may include or may be reception quality information indicating a reception quality from a neighboring cell.

The data may include or may be a measurement report.

The information may include or may be information identifying the neighboring cell.

The information may include or may be information identifying the reception quality.

The information may include or may be information indicating a reason why the mobile radio communication device is seeking a connection with a cell, for example a reason of a temporary gap in the call.

The information may include or may be information indicating a timing, for example information indicating a time of drop and a length of a period of time which has already passed time when determining a cell.

The cell determination circuit 206 may further be configured to determine the cell based on the reception quality.

The cell determination circuit 206 may further be configured to determine a cell with a maximum reception quality as the cell.

Figure 2B:
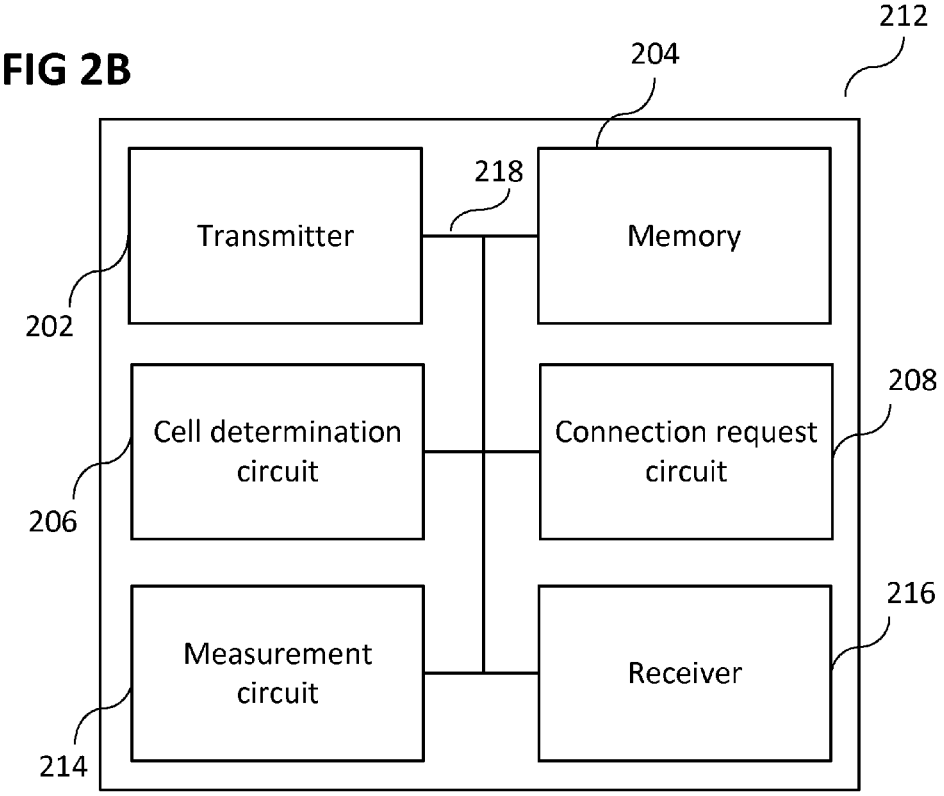
FIG. 2B shows a mobile radio communication device with a transmitter, a memory, a cell determination circuit, a connection request circuit, a measurement circuit, and a receiver.

FIG. 2B shows a mobile radio communication device 212. The mobile radio communication device 212 may, similar to the mobile radio communication device 200 of FIG. 2A, include a transmitter 202. The mobile radio communication device 212 may, similar to the mobile radio communication device 200 of FIG. 2A, further include a memory 204. The mobile radio communication device 212 may, similar to the mobile radio communication device 200 of FIG. 2A, further include a cell determination circuit 206. The mobile radio communication device 212 may, similar to the mobile radio communication device 200 of FIG. 2A, further include a connection request circuit 208. The mobile radio communication device 212 may further include a measurement circuit 214, like will be described below. The mobile radio communication device 212 may further include a receiver 216, like will be described below. The transmitter 202, the memory 204, the cell determination circuit 206, the connection request circuit 208, the measurement circuit 214, and the receiver 216 may be coupled with each other, for example via a connection 218, for example an optical connection or an electrical connection, such as for example a cable or a computer bus or via any other suitable electrical connection to exchange electrical signals.

The measurement circuit 214 may be configured to measure a reception quality from a neighboring cell (for example, the measurement circuit 214 may be configured to prepare a measurement report).

The receiver 216 may be configured to receive a confirmation of receipt of the data from the mobile radio communication network.

The information may include or may be information indicating receipt of the confirmation of receipt.

The cell determination circuit 206 may further be configured to determine the cell based on the information indicating receipt of the confirmation of receipt. It will be understood that the cell determination circuit 206 may determine the cell for example as a cell for which a measurement report has been transmitted and for which measurement report the mobile radio communication device 200 has received confirmation of receipt of this measurement report; furthermore, for example if there is no such cell or if connection with all such cells is not successful, the cell determination circuit 206 may determine the cell as a cell for which a measurement report has been transmitted and for which measurement report the mobile radio communication device 200 has not received confirmation of receipt of this measurement report (such a cell may for example be prepared, as for example the measurement report may have been received by the network, but just the confirmation of receipt may have been lost).

The cell determination circuit 206 may further be configured to determine a cell for which receipt is confirmed.

Figure 3A:
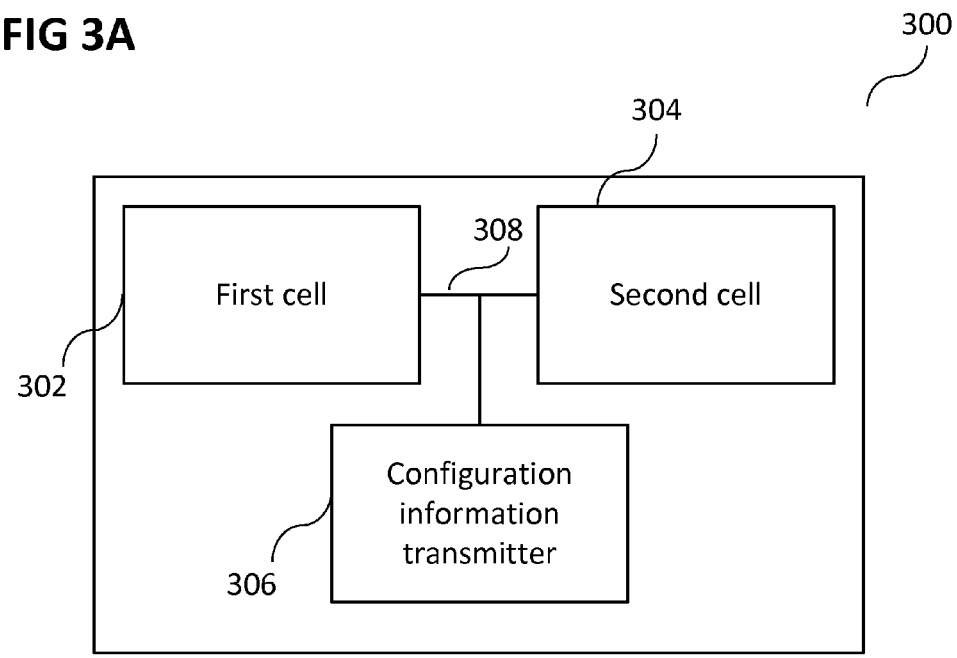
FIG. 3A shows a mobile radio communication network with a plurality of cells and a configuration information transmitter.

FIG. 3A shows a mobile radio communication network 300. The mobile radio communication network 300 may include a plurality of cells, for example a first cell 302 and a second cell 304. The first cell 302 may be configured to receive data from a mobile radio communication device (not shown). The mobile radio communication network 300 may further include a configuration information transmitter 306 configured to transmit to the second cell 304 configuration information based on the received information. The plurality of cells and the configuration information transmitter 306 may be coupled with each other, for example via a connection 308, for example an optical connection or an electrical connection, such as for example a cable or a computer bus or via any other suitable electrical connection to exchange electrical signals.

In other words, once the mobile radio communication network 300 receives predetermined data (for example a measurement report indication measurement results for the second cell 304) from a mobile communication device (for example via the first cell 302) it transmits configuration information to a second cell 304.

Figure 3B:
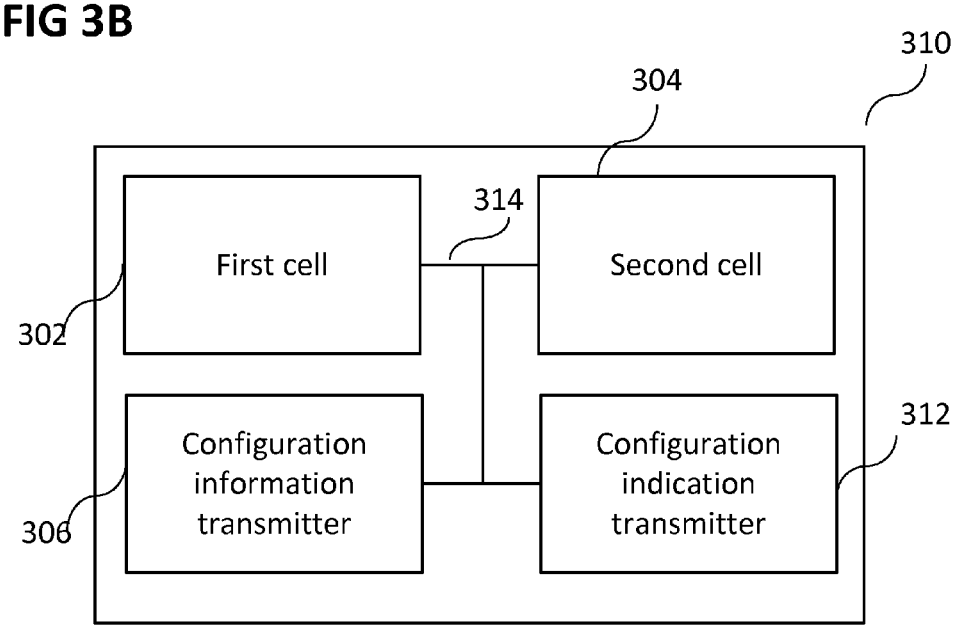
FIG. 3B shows a mobile radio communication network with a plurality of cells, a configuration information transmitter, and a configuration indication transmitter.

FIG. 3B shows a mobile radio communication network 310. The mobile radio communication network 310 may, similar to the mobile radio communication network 300 of FIG. 3A, include a plurality of cells (for example a first cell 302 and a second cell 304). The mobile radio communication network 310 may, similar to the mobile radio communication network 300 of FIG. 3A, further include a configuration information transmitter 306. The mobile radio communication network 310 may further include a configuration indication transmitter 312 configured to transmit to the mobile radio communication device an indication indicating that the mobile radio communication network 310 has transmitted configuration information to the second cell. The plurality of cells, the configuration information transmitter 306, and the configuration indication transmitter 312 may be coupled with each other, for example via a connection 314, for example an optical connection or an electrical connection, such as for example a cable or a computer bus or via any other suitable electrical connection to exchange electrical signals.

The indication may include or may be at least one of an identifier of the cell, a frequencies to be used for reestablishment attempts, an indication of whether intra reestablishments are possible or an indication of whether inter reestablishments are possible.

The configuration information transmitter 306 may further be configured to transmit the configuration information to a plurality of cells.

The configuration information transmitter 306 may further be configured to broadcast the configuration information.

The configuration information may include or may be a flag indicating the second cell.

The second cell 304 may include the configuration indication transmitter 306.

The configuration indication transmitter 312 may further be configured to transmit the indication to a plurality of mobile radio communication devices.

The configuration indication transmitter 312 may further be configured to broadcast the indication.

The indication may include or may be at least one of a flag indicating that the second cell has received the configuration information, an identifier of the cell to which the mobile radio communication device was connected before, identifiers of a plurality of mobile radio communication devices for which the cell has received configuration information.

The configuration information may include or may be a context of the mobile radio communication device.

The configuration information may include or may be at least one of configuration details of the mobile radio communication device, frequencies used for communication of the mobile radio communication device with the mobile radio communication network 310, capabilities of the mobile radio communication or cipher information.

FIG. 4A shows a flow diagram 400 illustrating a method for controlling a mobile radio communication device to operate in a first communication state and in a second communication state. In the first communication state, the mobile radio communication device may be in a connection with a cell of a mobile radio communication network. In the second communication state, the mobile radio communication device seeks a connection with a cell of a mobile radio communication network. In 402, a transmitter of the mobile radio communication device may transmit data to the mobile radio communication network when the mobile radio communication device is in the first communication state. In 404, a memory of the mobile radio communication device may store information based on the transmitted data. The memory may furthermore store information about collected data (for example information about quality, about neighbors or about a reason why the mobile radio communication device is seeking connection with a cell of the mobile radio communication network). In 406, a cell determination circuit of the mobile radio communication device may determine a cell of a mobile radio communication network as a connection candidate based on the stored information. In 408, a connection request circuit of the mobile radio communication device may request connection with the determined cell (for example may request a reestablishment of a (previous) connection) when the mobile radio communication device is in the second communication state.

The first communication state may be a connected state.

The second communication state may be a connected state in which connection has been temporarily lost or an idle state.

The data may include or may be reception quality information indicating a reception quality from a neighboring cell.

The data may include or may be a measurement report.

The information may include or may be information identifying the neighboring cell.

The information may include or may be information identifying the reception quality.

The information may include or may be information indicating a reason why the mobile radio communication device is seeking a connection with a cell, for example a reason of a temporary gap in the call.

The information may include or may be information indicating a timing, for example information indicating a time of drop and a length of a period of time which has already passed time when determining a cell.

The method may further include determining the cell based on the reception quality.

The method may further include determining a cell with a maximum reception quality as the cell.

The method may further include measuring a reception quality from a neighboring cell.

The method may further include receiving a confirmation of receipt of the data from the mobile radio communication network. It will be understood that the cell determination circuit may determine the cell for example as a cell for which a measurement report has been transmitted and for which measurement report the mobile radio communication device has received confirmation of receipt of this measurement report; furthermore, for example if there is no such cell or if connection with all such cells is not successful, the cell determination circuit may determine the cell as a cell for which a measurement report has been transmitted and for which measurement report the mobile radio communication device has not received confirmation of receipt of this measurement report (such a cell may for example be prepared, as for example the measurement report may have been received by the network, but just the confirmation of receipt may have been lost).

The information may include or may be information indicating receipt of the confirmation of receipt.

The method may further include determining the cell based on the information indicating receipt of the confirmation of receipt.

The method may further include determining a cell for which receipt is confirmed.

FIG. 4B shows a flow diagram 410 illustrating a method for controlling a mobile radio communication network. In 412, a first cell of a plurality of cells of the mobile radio communication network may receive data from a mobile radio communication device. In 414, a configuration information transmitter of the mobile radio communication network may transmit to a second cell of the plurality of cells configuration information based on the received information.

The method may further include transmitting to the mobile radio communication device an indication indicating that the mobile radio communication network has transmitted configuration information to the second cell.

The indication may include or may be at least one of an identifier of the cell, a frequencies to be used for reestablishment attempts, an indication of whether intra reestablishments are possible or an indication of whether inter reestablishments are possible.

The method may further include transmitting the configuration information to a plurality of cells.

The method may further include broadcasting the configuration information.

The indication may include or may be a flag indicating the second cell.

The method may further include transmitting the indication from the second cell.

The method may further include transmitting the indication to a plurality of mobile radio communication devices.

The method may further include broadcasting the indication.

The indication may include or may be at least one of a flag indicating that the second cell has received the configuration information, an identifier of the cell to which the mobile radio communication device was connected before, identifiers of a plurality of mobile radio communication devices for which the cell has received configuration information.

The configuration information may include or may be a context of the mobile radio communication device.

The configuration information may include or may be at least one of configuration details of the mobile radio communication device, frequencies used for communication of the mobile radio communication device with the mobile radio communication network, capabilities of the mobile radio communication or cipher information.

An UE based mechanism may be provided to detect that a cell potentially is a prepared cell. The reestablishment trials may be enhanced to more than one cell in case the first attempt (or the first attempts) was (or were) not successful. In addition, a mechanism may be provided to create a list of candidate cells for reestablishment based on pre-determined criteria. The criteria may be used to evaluate the order of cells for attempting to reestablish the connection.

The UE may make a more constructive decision on the cells to be used for reestablishment. The probability of a successful reestablishment may be increased, and the average time duration until the connection is reestablished may be decreased. Overall the reestablishment procedures may get optimized in performance and may result in much better user-experience of the UE which are seen e.g. as higher data-throughput or better voice quality and shorter audio-gaps.

During an ongoing connection, the mobile radio communication device may perform the following actions. The mobile radio communication device may store the cells that have been reported to the network by sending measurement report message(s). This storing may include storing the cell reception power level and the quality level (for example RSRP (Reference (Received) Signal Code Power) and RSRQ (Reference Signal Received Quality)). The mobile radio communication device may store the information if the measurement report message was acknowledged by the network (which for example may indicate that the network received the measurement report successfully). The mobile radio communication device may store only reports that indicate strong cells, and for example may not store reports in case the report is triggered because the cell got weak. The mobile radio communication device may exclude CSG (closed subscriber group) or blacklisted cells, and may not use them for reestablishment as they will most likely not be prepared.

Figure 5:
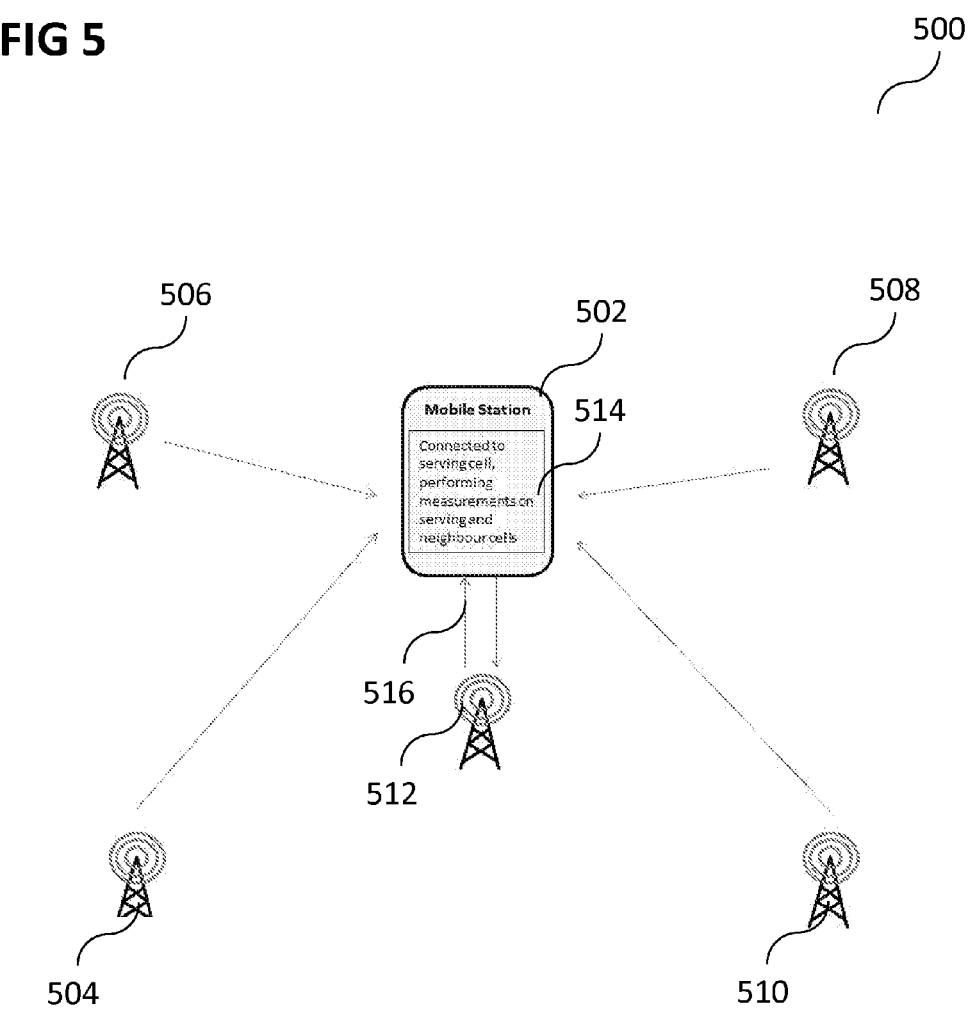
FIG. 5 shows a mobile radio communication network, in which a mobile radio communication device is connected to a cell and performs measurements.

FIG. 5 shows a mobile radio communication network 500 according to various aspects. A mobile radio communication device 502, which may also be referred to as a mobile station or a user equipment (UE), may be in the coverage area of a plurality of radio base stations, each radio base station (or short: base station) providing one or more cells. For example, a first (neighbor) cell 504, a second (neighbor) cell 506, a third (neighbor) cell 508, a fourth (neighbor) cell 510, and fifth (neighbor) cell 512 may be provided. A base station may for example be an EUTRAN (Evolved Universal Terrestrial Radio Access Network) base station, but may also be any other kind of base station configured to communicate with a mobile radio communication device. For example, the sixth cell 512 may be the serving cell, to which the mobile station is connected, like indicated by two arrows 516. Like indicated in status 514 of the mobile radio communication device 502, the mobile radio communication device 502 (in other words, the mobile station) may be connected to the serving cell 512, and may perform measurements on the serving cell 512 and on the neighboring cells 504, 506, 508, and 510.

Figure 6:
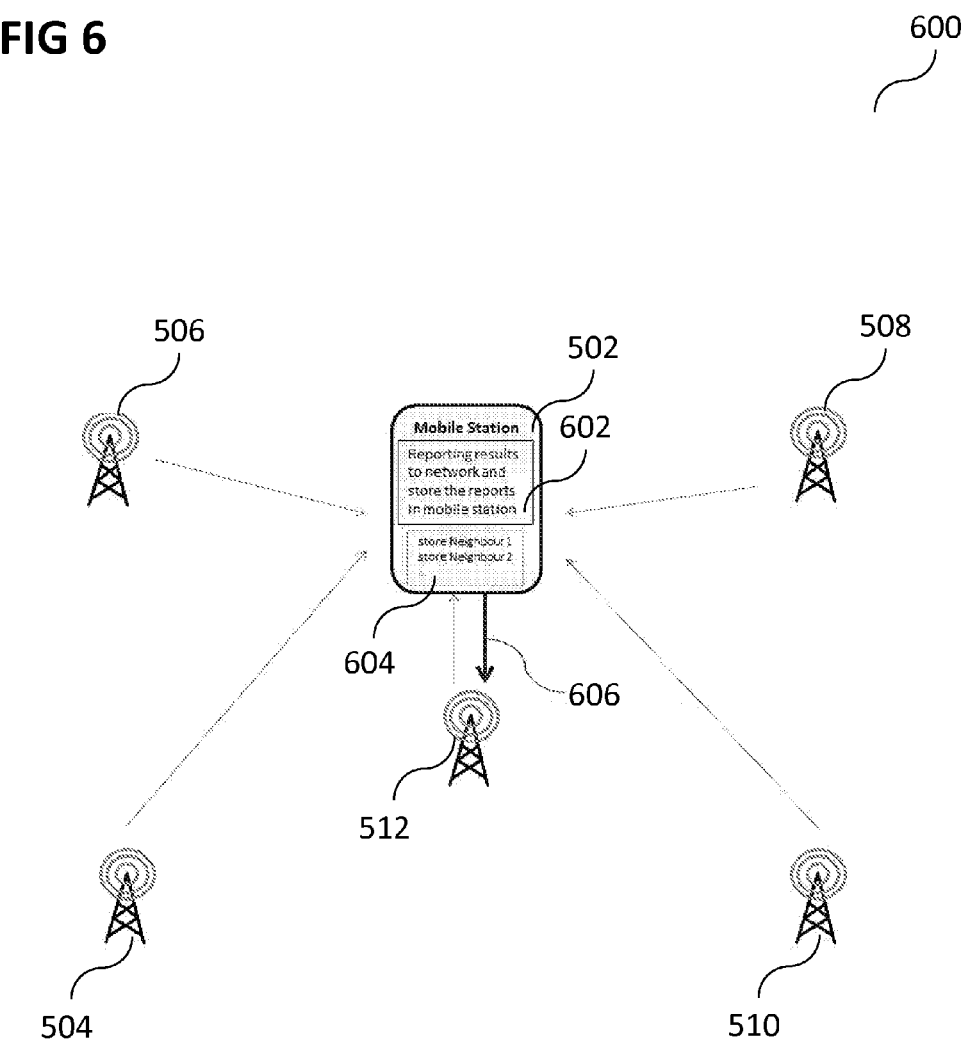
FIG. 6 shows a mobile radio communication network, in which a mobile radio communication device reports measurement results.

FIG. 6 shows an illustration 600 of the mobile radio communication system 500 of FIG. 5 at another point of time. It will be understood that the cells and the mobile radio communication device may be identical to the ones shown in FIG. 5, and therefore the same reference signs may be used and duplicate description may be omitted. As indicated in status 602 of the mobile radio communication device 502, the mobile station may report (or send) the (measurement) results to the network (like indicated by arrow 606), and may store the reports in the mobile radio communication device 502. As illustrated in a memory portion 604 of the mobile radio communication device 502, the mobile station 502 may store results of the performed measurement.

Figure 7:
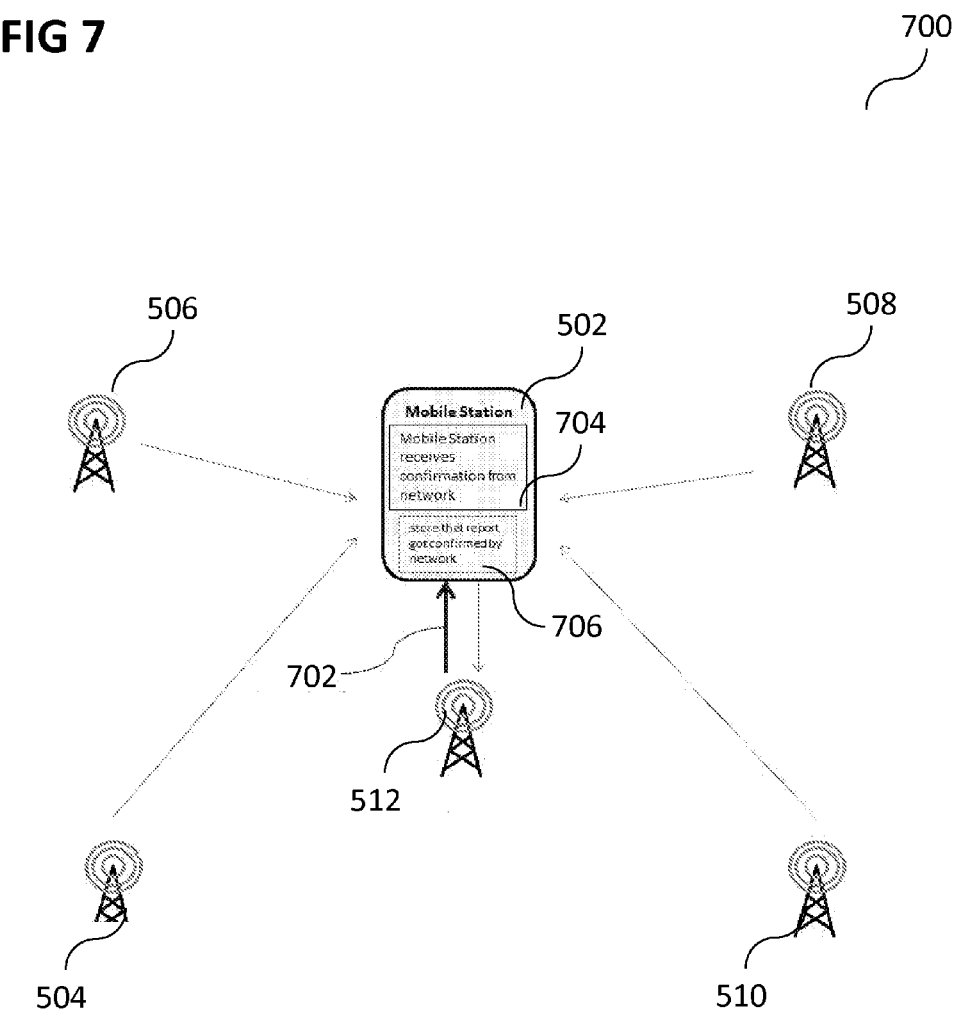
FIG. 7 shows a mobile radio communication network, in which a mobile radio communication device receives confirmation of receipt of measurement results from the mobile radio communication network.

FIG. 7 shows an illustration 700 of the mobile radio communication system 500 of FIG. 5 at another point of time. It will be understood that the cells and the mobile radio communication device may be identical to the ones shown in FIG. 5 and FIG. 6, and therefore the same reference signs may be used and duplicate description may be omitted. As indicated by arrow 702, the network may confirm the reception of the report that was send by the mobile radio communication device 502. As indicated by status 704 of the mobile radio communication device 502, the mobile radio communication device 502 may receive the confirmation from the network (for example from the serving cell 512). The mobile radio communication device 502 may store that the report got confirmed by the network, like indicated by a memory portion 706 of the mobile radio communication device 502.

Figure 8:
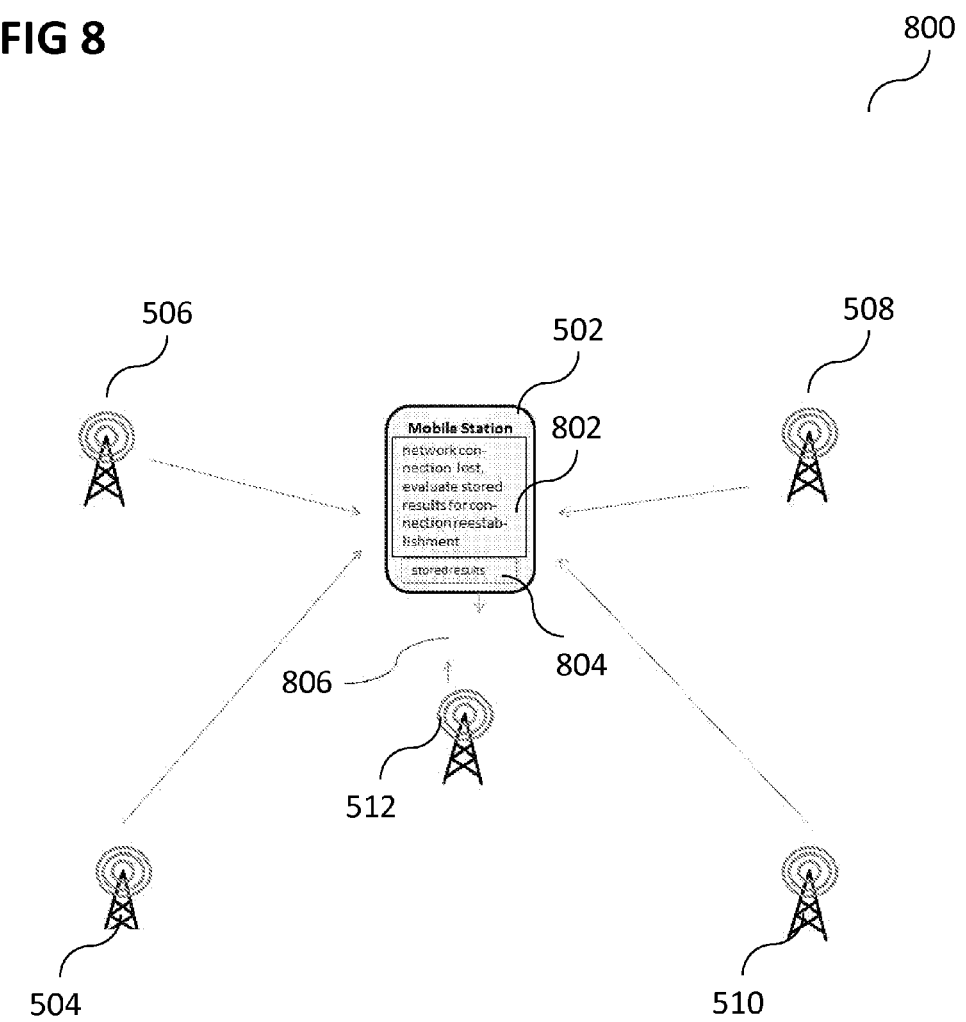
FIG. 8 shows a mobile radio communication network, in which a mobile radio communication device has lost connection with a cell.

FIG. 8 shows an illustration 800 of the mobile radio communication system 500 of FIG. 5 at another point of time. It will be understood that the cells and the mobile radio communication device may be identical to the ones shown in FIG. 5, FIG. 6, and FIG. 7, and therefore the same reference signs may be used and duplicate description may be omitted. Like indicated by memory portion 804 (which may include the memory portion 604 shown in FIG. 6 and the memory portion 706 shown in FIG. 7), the mobile radio communication device 502 may have stored results. It will be understood that in various embodiments there may be no separate memory portions, but only one combined memory to store all the results, for example the measurement results sent and the information indicating whether the network has confirmed receipt of the measurement results. Like indicated by short arrows 806, the mobile radio communication device 502 may lose connection with the serving cell 512, in other words, there may be a loss of connection. Like indicated by status 802 of the mobile radio communication device 502, network connection may be lost, and the stored results may be evaluated for connection reestablishment.

Figure 9:
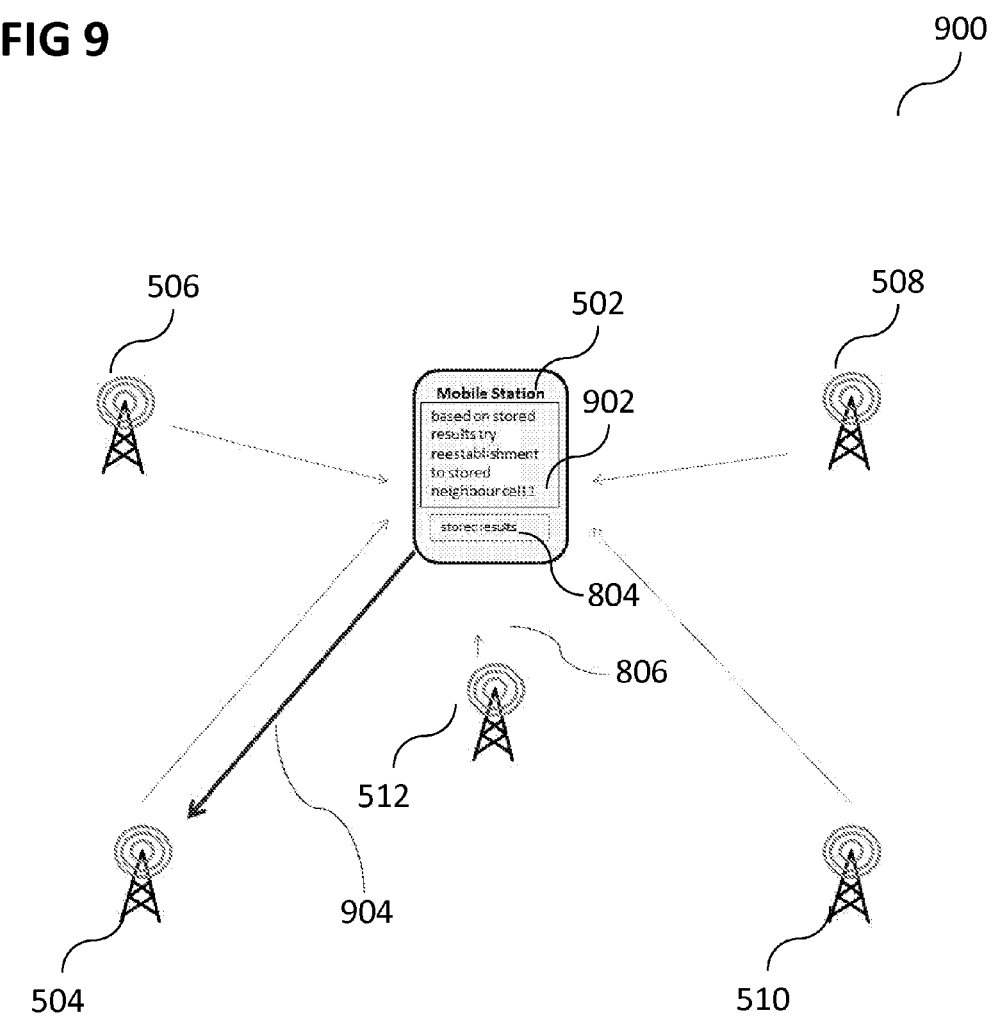
FIG. 9 shows a mobile radio communication network, in which a mobile radio communication device performs a connection reestablishment method.

FIG. 9 shows an illustration 900 of the mobile radio communication system 500 of FIG. 5 at another point of time. It will be understood that the cells and the mobile radio communication device may be identical to the ones shown in FIG. 5, FIG. 6, FIG. 7, and FIG. 8, and therefore the same reference signs may be used and duplicate description may be omitted. Like indicated by status 902 of the mobile radio communication device 502, the mobile radio communication device 502 may, based on the stored results, try reestablishment to a neighboring cell, for which information is stored in the memory portion 804, for example to the first neighbor cell 504. Like indicated by arrow 904, the mobile radio communication device 502 may attempt to perform connection reestablishment to the first neighbor cell 504.

A detailed method used for reestablishment-cell-search according to various aspects may be as follows. In case the reestablishment procedure was triggered by events which are most likely not related to serving cell quality like RLC-retransmission-errors (wherein RLC may stand for Radio Link Control), reconfiguration, handover or integrity failure, the mobile radio communication device may try reestablishment on the old serving cell and may check the serving cell quality. In case the old serving cell was (or is) weak and out-of-sync-detection caused the reestablishment, the mobile radio communication device may not try to reestablish on the old serving cell as this one will be still bad. The mobile radio communication device may consider the reported cells as the best cells for reestablishment, starting with those whose reports were already acknowledged. The mobile radio communication device may continue trying reestablishment in decreasing order of cell quality (wherein for example the best cell comes first in the measurement report message). The mobile radio communication device may move on to older reports (for example second last one, third last one, and so on) for additional reestablishment attempts.

Various aspects may cover the network behavior. According to various aspects, the network may prepare all or a specific number of cells that have been reported by the UE. According to various aspects, the network may indicate cells, physical_cell_id ranges, and/or frequencies to be used for reestablishment attempts, for example the network may indicate what kind of reestablishments are possible, for example intra (frequency) reestablishments or inter (frequency) reestablishments. A cell in an inter frequency re-establish procedure may use a different frequency compared to an intra frequency reestablishment procedure.

The cell-search-procedure for reestablishment may be a procedure which is performed in UE-IDLE mode after the interruption of the ongoing connection and aims for quickly finding a cell, on which the UE is able to continue the temporary interrupted connection. As the UE may have just entered IDLE-mode, it may have only limited knowledge of currently available good cells or frequencies. However in CONNECTED-mode just before the interruption, the UE may have lots of information like cell-lists, frequency list, quality of serving cell and neighbor cells and most important the knowledge, which cells (and/or frequencies) the UE reported to the NW as being cells with good quality for the UE. Most likely only those cells will get the information (for example the UE context which carries e.g. configuration-details, cipher information, etc.) within the network to be able to continue (or to reestablish) the connection. For example, the UE context may be exchange during a handover preparation. The UE context may include UE Radio Access capabilities (for example information about the capabilities of the UE, e.g. about 2G (second generation) ability, about 3G (third generation) ability, about power class of the UE, about supported bands, about FDD (frequency division duplex) support, about TDD (time division duplex) support, about supported features (for example ROHC (Robust Header Compression), handover, reselection to other RATs (radio access technologies), features according the Feature Group Indicators); about supported cipher keys, and about supported integrity keys). The UE context may include an AS (access stratum) context (for example including information about local EUTRAN context, e.g. Source Cell-ID, shortMAX-ID for continuing of security methods). The UE context may include information about AS configuration (for example present measurement configuration of the UE, dedicated resource configuration, security methods, C-RNTI (Cell Radio Network Temporary Identity; for example an identifier of the UE), MIB (master information block), SIB1 (system information block 1), SIB2 (system information block 2), antenna information, or carrier frequency).

Parts of or the whole gathered information during connected mode may be used and especially the information that the mobile radio communication device has sent to the network for the cell search in idle-mode.

The mobile station may store the information about serving and neighbor cells measurement results which the mobile station reported to the network during an ongoing connection.

The mobile station may consider defined criteria to decide if a reported cell shall be stored in the mobile station or not. The criteria may include the measured quality of the cell and the reason why the cell was reported.

The mobile station may save the information about the cell specific measurement results for each of the stored cells.

The mobile station may store, for each reported message, whether the network has confirmed the reception of the message or not.

The mobile station may use the stored information to perform a Connection Reestablishment procedure by using the stored cell information to derive the order of cells for searching of a cell, trying to synchronize on the cell and attempting a Connection Reestablishment.

According to various embodiments, information from an UE's connected mode (for example information sent by the UE in the connected mode) may be reused in idle mode.

The information from UE's connected mode may repeatedly be used in Idle mode. For example, after choosing the first cell and getting rejected on it, the UE may continue with other available information by selecting and trying reestablishment on further cells.

The various methods and device may for example be used in an LTE (Long Term Evolution)-Network (for example E-UTRAN), or for the GSM-UE operating in the GSM-network (for example GERAN (GSM EDGE (Enhanced Data rates for GSM Evolution) Radio Access Network)) or in any other communication networks.

According to various aspects, some procedures may be specified, where an UE may be sure that the chosen cell is prepared. This may be achieved if the target cell broadcasts (as soon as it got prepared) in some system information, that it is a prepared cell. Various options may be possible:

- Broadcasting just a flag, which indicates that the cell is a prepared cell. Herewith at least some improvement in the cell search can be achieved.
- Broadcasting the old ID (identifier, for example C-RNTI (Cell Radio Network Temporary Identity)) from the UE, whose context was moved to the target cell, so that other mobiles do not try reestablishment and the own UE is sure, that the cell was at least prepared with its context.
- Broadcasting more IDs, if it is possible that a cell is prepared for more than one UE.
- Broadcasting the ID(s) in existing SIB1 (System Information Block 1) or SIB2 (System Information Block 2), which may be mandatory to be received before reestablishment.
- Broadcasting the ID(s) in a new defined SIB (System Information Block), which then may only be mandatory to be read by UEs searching for a cell for reestablishment.

The mobile radio communication device and the mobile radio communication network may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handyphone System), WiDEN (Wideband Integrated Digital Enhanced Network), iBurst, Unlicensed Mobile Access (UMA, also referred to as 3GPP Generic Access Network, or GAN standard).

The following examples pertain to further aspects.

Example 1 is a mobile radio communication device configured to operate in a first communication state and in a second communication state, the mobile radio communication device comprising: a transmitter configured to transmit data to a mobile radio communication network when the mobile radio communication device is in a first communication state in which the mobile radio communication device is in a connection with a cell of the mobile radio communication network; a memory configured to store information based on the transmitted data; a cell determination circuit configured to determine a cell of a mobile radio communication network as a connection candidate based on the stored information; and a connection request circuit configured to request connection with the determined cell when the mobile radio communication device is in a second communication state in which the mobile radio communication device seeks a connection with a cell of a mobile radio communication network.

In example 2, the subject-matter of any one Example 1 can optionally include that the first communication state is a connected state.

In example 3, the subject-matter of any one of Examples 1-2 can optionally include that the second communication state is one of a connected state in which connection has been temporarily lost or an idle state.

In example 4, the subject-matter of any one of Examples 1-3 can optionally include that the data comprises reception quality information indicating a reception quality from a neighboring cell.

In example 5, the subject-matter of any one of Examples 1-4 can optionally include that the data comprises a measurement report.

In example 6, the subject-matter of Example 4 can optionally include that the information comprises information identifying the neighboring cell.

In example 7, the subject-matter of any one of Examples 4 or 6 can optionally include that the information comprises at least one of information identifying the reception quality, information indicating a reason why the mobile radio communication device is seeking a connection with a cell, or information indicating a timing.

In example 8, the subject-matter of Example 7 can optionally include that the cell determination circuit is further configured to determine the cell based on the reception quality.

In example 9, the subject-matter of any one of Examples 7-8 can optionally include that the cell determination circuit is further configured to determine a cell with a maximum reception quality as the cell.

In example 10, the subject-matter of any one of Examples 1-9 can optionally include a measurement circuit configured to measure a reception quality from a neighboring cell.

In example 11, the subject-matter of any one of Examples 1-10 can optionally include a receiver configured to receive a confirmation of receipt of the data from the mobile radio communication network.

In example 12, the subject-matter of Example 11 can optionally include that the information comprises information indicating receipt of the confirmation of receipt.

In example 13, the subject-matter of Example 12 can optionally include that the cell determination circuit is further configured to determine the cell based on the information indicating receipt of the confirmation of receipt.

In example 14, the subject-matter of any one of Examples 12-13 can optionally include that the cell determination circuit is further configured to determine a cell for which receipt is confirmed.

Example 15 is a method for controlling a mobile radio communication device to operate in a first communication state and in a second communication state, the method comprising: transmitting data to a mobile radio communication network when the mobile radio communication device is in a first communication state; storing information based on the transmitted data in which the mobile radio communication device is in a connection with a cell of the mobile radio communication network; determining a cell of a mobile radio communication network as a connection candidate based on the stored information; and requesting connection with the determined cell when the mobile radio communication device is in a second communication state in which the mobile radio communication device seeks a connection with a cell of a mobile radio communication network.

In example 16, the subject-matter of Example 15 can optionally include that the first communication state is a connected state.

In example 17, the subject-matter of any one of Examples 15-16 can optionally include that the second communication state is one of a connected state in which connection has been temporarily lost or an idle state.

In example 18, the subject-matter of any one of Examples 15-17 can optionally include that the data comprises reception quality information indicating a reception quality from a neighboring cell.

In example 19, the subject-matter of any one of Examples 15-19 can optionally include that the data comprises a measurement report.

In example 20, the subject-matter of Example 18 can optionally include that the information comprises information identifying the neighboring cell.

In example 21, the subject-matter of any one of Examples 18 or 21 can optionally include that the information comprises at least one of information identifying the reception quality, information indicating a reason why the mobile radio communication device is seeking a connection with a cell, or information indicating a timing.

In example 22, the subject-matter of Example 21 can optionally include determining the cell based on the reception quality.

In example 23, the subject-matter of any one of Examples 21-22 can optionally include determining a cell with a maximum reception quality as the cell.

In example 24, the subject-matter of any one of Examples 15-23 can optionally include measuring a reception quality from a neighboring cell.

In example 25, the subject-matter of any one of Examples 15-24 can optionally include receiving a confirmation of receipt of the data from the mobile radio communication network.

In example 26, the subject-matter of Example 25 can optionally include that the information comprises information indicating receipt of the confirmation of receipt.

In example 27, the subject-matter of Example 26 can optionally include determining the cell based on the information indicating receipt of the confirmation of receipt.

In example 28, the subject-matter of any one of Examples 26-27 can optionally include determining a cell for which receipt is confirmed.

Example 29 is a mobile radio communication device configured to operate in a first communication state and in a second communication state, the mobile radio communication device comprising: a transmitter means for transmitting data to a mobile radio communication network when the mobile radio communication device is in a first communication state in which the mobile radio communication device is in a connection with a cell of the mobile radio communication network; a memory means for storing information based on the transmitted data; a cell determination means for determining a cell of a mobile radio communication network as a connection candidate based on the stored information; and a connection request means for requesting connection with the determined cell when the mobile radio communication device is in a second communication state in which the mobile radio communication device seeks a connection with a cell of a mobile radio communication network.

In example 30, the subject-matter of Example 29 can optionally include that the first communication state is a connected state.

In example 31, the subject-matter of any one of Examples 29-30 can optionally include that the second communication state is one of a connected state in which connection has been temporarily lost or an idle state.

In example 32, the subject-matter of any one of Examples 29-31 can optionally include that the data comprises reception quality information indicating a reception quality from a neighboring cell.

In example 33, the subject-matter of any one of Examples 29-32 can optionally include that the data comprises a measurement report.

In example 34, the subject-matter of Example 32 can optionally include that the information comprises information identifying the neighboring cell.

In example 35, the subject-matter of any one of Examples 32 or 34 can optionally include that the information comprises at least one of information identifying the reception quality, information indicating a reason why the mobile radio communication device is seeking a connection with a cell, or information indicating a timing.

In example 36, the subject-matter of Example 35 can optionally include that the cell determination means is further for determining the cell based on the reception quality.

In example 37, the subject-matter of any one of Examples 35-36 can optionally include that the cell determination means is further for determining a cell with a maximum reception quality as the cell.

In example 38, the subject-matter of any one of Examples 29-37 can optionally include a measurement means for measuring a reception quality from a neighboring cell.

In example 39, the subject-matter of any one of Examples 29-38 can optionally include a receiver means for receiving a confirmation of receipt of the data from the mobile radio communication network.

In example 40, the subject-matter of Example 39 can optionally include that the information comprises information indicating receipt of the confirmation of receipt.

In example 41, the subject-matter of Example 40 can optionally include that the cell determination means is further for determining the cell based on the information indicating receipt of the confirmation of receipt.

In example 42, the subject-matter of any one of Examples 40-41 can optionally include that the cell determination means is further for determining a cell for which receipt is confirmed.

Example 43 is a computer readable medium including program instructions which when executed by a processor cause the processor to perform a method for controlling a mobile radio communication device to operate in a first communication state and in a second communication state, the computer readable medium further including program instructions which when executed by a processor cause the processor to perform: transmitting data to a mobile radio communication network when the mobile radio communication device is in a first communication state in which the mobile radio communication device is in a connection with a cell of the mobile radio communication network; storing information based on the transmitted data; determining a cell of a mobile radio communication network as a connection candidate based on the stored information; and requesting connection with the determined cell when the mobile radio communication device is in a second communication state in which the mobile radio communication device seeks a connection with a cell of a mobile radio communication network.

In example 44, the subject-matter of Example 43 can optionally include that the first communication state is a connected state.

In example 45, the subject-matter of any one of Examples 43-44 can optionally include that the second communication state is one of a connected state in which connection has been temporarily lost or an idle state.

In example 46, the subject-matter of any one of Examples 43-45 can optionally include that the data comprises reception quality information indicating a reception quality from a neighboring cell.

In example 47, the subject-matter of any one of Examples 43-46 can optionally include that the data comprises a measurement report.

In example 48, the subject-matter of Example 46 can optionally include that the information comprises information identifying the neighboring cell.

In example 49, the subject-matter of any one of Examples 46 or 48 can optionally include that the information comprises at least one of information identifying the reception quality, information indicating a reason why the mobile radio communication device is seeking a connection with a cell, or information indicating a timing.

In example 50, the subject-matter of Example 49 can optionally include program instructions which when executed by a processor cause the processor to perform: determining the cell based on the reception quality.

In example 51, the subject-matter of any one of Examples 49 or 50 can optionally include program instructions which when executed by a processor cause the processor to perform: determining a cell with a maximum reception quality as the cell.

In example 52, the subject-matter of any one of Examples 43-51 can optionally include program instructions which when executed by a processor cause the processor to perform: measuring a reception quality from a neighboring cell.

In example 53, the subject-matter of any one of Examples 43-52 can optionally include program instructions which when executed by a processor cause the processor to perform: receiving a confirmation of receipt of the data from the mobile radio communication network.

In example 54, the subject-matter of Example 53 can optionally include that the information comprises information indicating receipt of the confirmation of receipt.

In example 55, the subject-matter of Example 54 can optionally include program instructions which when executed by a processor cause the processor to perform: determining the cell based on the information indicating receipt of the confirmation of receipt.

In example 56, the subject-matter of any one of Examples 54 or 55 can optionally include program instructions which when executed by a processor cause the processor to perform: determining a cell for which receipt is confirmed.

Example 57 is a mobile radio communication network comprising: a plurality of cells, wherein a first cell of the plurality of cells is configured to receive data from a mobile radio communication device; and a configuration information transmitter configured to transmit to a second cell of the plurality of cells configuration information based on the received information.

In example 58, the subject-matter of Example 57 can optionally include a configuration indication transmitter configured to transmit to the mobile radio communication device an indication indicating that the mobile radio communication network has transmitted configuration information to the second cell.

In example 59, the subject-matter of Example 58 can optionally include that the indication comprises at least one of an identifier of the cell, a frequencies to be used for reestablishment attempts, an indication of whether intra reestablishments are possible or an indication of whether inter reestablishments are possible.

In example 60, the subject-matter of any one of Examples 57-59 can optionally include that the configuration information transmitter is further configured to transmit the configuration information to a plurality of cells.

In example 61, the subject-matter of any one of Examples 57-60 can optionally include that the configuration information transmitter is further configured to broadcast the configuration information.

In example 62, the subject-matter of Example 60 can optionally include that the configuration information comprises a flag indicating the second cell.

In example 63, the subject-matter of any one of Examples 58-59 can optionally include that the second cell comprises the configuration indication transmitter.

In example 64, the subject-matter of Examples 63 can optionally include that the configuration indication transmitter is further configured to transmit the indication to a plurality of mobile radio communication devices.

In example 65, the subject-matter of any one of Examples 63-64 can optionally include that the configuration indication transmitter is further configured to broadcast the indication.

In example 66, the subject-matter of any one of Examples 63-65 can optionally include that the indication comprises at least one of a flag indicating that the second cell has received the configuration information, an identifier of the cell to which the mobile radio communication device was connected before, identifiers of a plurality of mobile radio communication devices for which the cell has received configuration information.

In example 67, the subject-matter of any one of Examples 57-66 can optionally include that the configuration information comprises a context of the mobile radio communication device.

In example 68, the subject-matter of any one of Examples 57-67 can optionally include that the configuration information comprises at least one of configuration details of the mobile radio communication device, frequencies used for communication of the mobile radio communication device with the mobile radio communication network, capabilities of the mobile radio communication or cipher information.

Example 69 is a method for controlling a mobile radio communication, the method comprising: receiving in a first cell of a plurality of cells of the mobile radio communication network data from a mobile radio communication device; and transmitting to a second cell of the plurality of cells configuration information based on the received information.

In example 70, the subject-matter of Example 69 can optionally include transmitting to the mobile radio communication device an indication indicating that the mobile radio communication network has transmitted configuration information to the second cell.

In example 71, the subject-matter of Example 70 can optionally include that the indication comprises at least one of an identifier of the cell, a frequencies to be used for reestablishment attempts, an indication of whether intra reestablishments or possible or an indication of whether inter reestablishments are possible.

In example 72, the subject-matter of any one of Examples 69-71 can optionally include transmitting the configuration information to a plurality of cells.

In example 73, the subject-matter of any one of Examples 69-72 can optionally include broadcasting the configuration information.

In example 74, the subject-matter of Example 72 can optionally include that the configuration information comprises a flag indicating the second cell.

In example 75, the subject-matter of any one of Examples 70-71 can optionally include transmitting the indication from the second cell.

In example 76, the subject-matter of Example 75 can optionally include transmitting the indication to a plurality of mobile radio communication devices.

In example 77, the subject-matter of any one of Examples 75-76 can optionally include broadcasting the indication.

In example 78, the subject-matter of any one of Examples 75-77 can optionally include that the indication comprises at least one of a flag indicating that the second cell has received the configuration information, an identifier of the cell to which the mobile radio communication device was connected before, identifiers of a plurality of mobile radio communication devices for which the cell has received configuration information.

In example 79, the subject-matter of any one of Examples 69-78 can optionally include that the configuration information comprises a context of the mobile radio communication device.

In example 80, the subject-matter of any one of Examples 69-79 can optionally include that the configuration information comprises at least one of configuration details of the mobile radio communication device, frequencies used for communication of the mobile radio communication device with the mobile radio communication network, capabilities of the mobile radio communication or cipher information.

Example 81 is a mobile radio communication network comprising: a plurality of cells, wherein a first cell of the plurality of cells is configured to receive data from a mobile radio communication device; and a configuration information transmitter means for transmitting to a second cell of the plurality of cells configuration information based on the received information.

In example 82, the subject-matter of Example 81 can optionally include a configuration indication transmitter means for transmitting to the mobile radio communication device an indication indicating that the mobile radio communication network has transmitted configuration information to the second cell.

In example 83, the subject-matter of Example 82 can optionally include that the indication comprises at least one of an identifier of the cell, a frequencies to be used for reestablishment attempts, an indication of whether intra reestablishments or possible or an indication of whether inter reestablishments are possible.

In example 84, the subject-matter of any one of Examples 81-83 can optionally include that the configuration information transmitter means is further for transmitting the configuration information to a plurality of cells.

In example 85, the subject-matter of any one of Examples 81-84 can optionally include that the configuration information transmitter means is further for broadcasting the configuration information.

In example 86, the subject-matter of any one of Examples 84 can optionally include that the configuration information comprises a flag indicating the second cell.

In example 87, the subject-matter of any one of Examples 82-83 can optionally include that the second cell comprises the configuration indication transmitter means.

In example 88, the subject-matter of Example 87 can optionally include that the configuration indication transmitter means is further for transmitting the indication to a plurality of mobile radio communication devices.

In example 89, the subject-matter of any one of Examples 87-88 can optionally include that the configuration indication transmitter means is further for broadcasting the indication.

In example 90, the subject-matter of any one of Examples 87-89 can optionally include that the indication comprises at least one of a flag indicating that the second cell has received the configuration information, an identifier of the cell to which the mobile radio communication device was connected before, identifiers of a plurality of mobile radio communication devices for which the cell has received configuration information.

In example 91, the subject-matter of any one of Examples 81-90 can optionally include that the configuration information comprises a context of the mobile radio communication device.

In example 92, the subject-matter of any one of Examples 81-91 can optionally include that the configuration information comprises at least one of configuration details of the mobile radio communication device, frequencies used for communication of the mobile radio communication device with the mobile radio communication network, capabilities of the mobile radio communication or cipher information.

Example 93 is a computer readable medium including program instructions which when executed by a processor cause the processor to perform a method for controlling a mobile radio communication, the computer readable medium further including program instructions which when executed by a processor cause the processor to perform: receiving in a first cell of a plurality of cells of the mobile radio communication network data from a mobile radio communication device; and transmitting to a second cell of the plurality of cells configuration information based on the received information.

In example 94, the subject-matter of Example 93 can optionally include program instructions which when executed by a processor cause the processor to perform: transmitting to the mobile radio communication device an indication indicating that the mobile radio communication network has transmitted configuration information to the second cell.

In example 95, the subject-matter of Example 94 can optionally include that the indication comprises at least one of an identifier of the cell, a frequencies to be used for reestablishment attempts, an indication of whether intra reestablishments are possible or an indication of whether inter reestablishments are possible.

In example 96, the subject-matter of any one of Examples 93-95 can optionally include program instructions which when executed by a processor cause the processor to perform: transmitting the configuration information to a plurality of cells.

In example 97, the subject-matter of any one of Examples 93-96 can optionally include program instructions which when executed by a processor cause the processor to perform: broadcasting the configuration information.

In example 98, the subject-matter of Example 96 can optionally include that the configuration information comprises a flag indicating the second cell.

In example 99, the subject-matter of any one of Examples 94-95 can optionally include program instructions which when executed by a processor cause the processor to perform: transmitting the indication from the second cell.

In example 100, the subject-matter of Example 99 can optionally include program instructions which when executed by a processor cause the processor to perform: transmitting the indication to a plurality of mobile radio communication devices.

In example 101, the subject-matter of any one of Examples 99-100 can optionally include program instructions which when executed by a processor cause the processor to perform: broadcasting the indication.

In example 102, the subject-matter of any one of Examples 99-101 can optionally include that the indication comprises at least one of a flag indicating that the second cell has received the configuration information, an identifier of the cell to which the mobile radio communication device was connected before, identifiers of a plurality of mobile radio communication devices for which the cell has received configuration information.

In example 103, the subject-matter of any one of Examples 93-102 can optionally include that the configuration information comprises a context of the mobile radio communication device.

In example 104, the subject-matter of any one of Examples 93-103 can optionally include that the configuration information comprises at least one of configuration details of the mobile radio communication device, frequencies used for communication of the mobile radio communication device with the mobile radio communication network, capabilities of the mobile radio communication or cipher information.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A mobile radio communication device configured to operate in a first communication state and in a second communication state, the mobile radio communication device comprising:
   a transmitter configured to transmit a report including reception quality information of one or more measured neighboring cells to a mobile radio communication network when the mobile radio communication device is in a first communication state in which the mobile radio communication device is in a connection with a first cell of the mobile radio communication network;
   a receiver configured to receive a confirmation of receipt of the report from the mobile radio communication network;
   a memory configured to store the reception quality information of each of the measured neighboring cells based on the transmitted reception quality information; and wherein the memory is further configured to store the reception quality information of the one or more measured neighboring cells within a confirmed report from the mobile radio communication network;
   a cell determination circuit configured to identify at least one measured neighboring cell of the measured neighboring cells within the confirmed report and the most recent serving cell of the mobile radio communication device as connection candidate cells, the cell determination circuit further configured to select a cell from the connection candidate cells; and
   a connection request circuit configured to request connection with the selected cell when the mobile radio communication device is in a second communication state in which the mobile radio communication device seeks to restore a connection with the mobile radio communication network after the connection with the first cell has terminated.

2. The mobile radio communication device of claim 1, wherein the first cell is the most recent serving cell, and wherein the connection with the first cell was terminated due to radio link failure.

3. The mobile radio communication terminal device of claim 2, wherein cells of the connection candidate cells are prioritized for selection as the determined cell based on at least one of information identifying the reception quality, information indicating a reason why the mobile radio communication device is seeking a connection with a cell, or information indicating a timing.

4. The mobile radio communication device of claim 1, wherein the reception quality information comprises a measurement report.

5. The mobile radio communication device of claim 1, wherein the first cell is the most recent serving cell of the mobile radio communication device.

6. The mobile radio communication device of claim 1, wherein the reception quality information comprises at least one of information identifying the reception quality of the one or more measured neighboring cells, information indicating a reason why the mobile radio communication device is seeking a connection with a cell, or information indicating a timing.

7. The mobile radio communication device of claim 6, wherein the cell determination circuit is further configured to select the selected cell from the connection candidate cells based on information identifying the reception quality associated with the connection candidate cells stored in the memory.

8. The mobile radio communication device of claim 6, wherein the cell determination circuit is further configured to select a cell from the connection candidate cells with a maximum reception quality as the determined cell.

9. The mobile radio communication device of claim 1, further comprising:
   a measurement circuit configured to measure a reception quality of neighboring cells.

10. The mobile radio communication device of claim 1, wherein the information of the one or more neighbor cells comprises information indicating receipt of the confirmation of receipt of the reception quality information from the mobile radio communication network.

11. The mobile radio communication device of claim 10, wherein the cell determination circuit is further configured to select the selected cell from the connection candidate cells based on the information indicating receipt of the confirmation of receipt.

12. The mobile radio communication terminal device of claim 1, wherein the memory is configured to store only the information of measured neighboring cells with reception quality information satisfying a threshold as selected neighboring cells.

13. A method for controlling a mobile radio communication device to operate in a first communication state and in a second communication state, the method comprising:
    transmitting a report including reception quality information of one or more measured neighboring cells to a mobile radio communication network when the mobile radio communication device is in a first communication state in which the mobile radio communication device is in a connection with a first cell of the mobile radio communication network;
    storing the reception quality information of each of the measured neighboring cells based on the transmitted reception quality information;
    receiving a confirmation of receipt of the report from the mobile radio communication network;
    storing the reception quality information of the one or more measured neighboring cells within a confirmed report from the mobile radio communication network;
    identifying at least one measured neighboring cell of the measured neighboring cells within the confirmed report and the most recent serving cell of the mobile radio communication device as connection candidate cells;
    selecting a cell from the connection candidate cells; and
    requesting connection with the selected cell when the mobile radio communication device is in a second communication state in which the mobile radio communication device seeks to restore a connection with the mobile radio communication network after the connection with the first cell has terminated.

14. The method of claim 13, wherein the first cell is the most recent serving cell, and wherein the connection with the first cell was terminated due to radio link failure.

15. The method of claim 13, wherein the information comprises information indicating receipt of the confirmation of receipt of the reception quality information from the mobile radio communication network.

16. A mobile radio communication network comprising:
    a plurality of cells, wherein a first cell of the plurality of cells is configured to receive a measurement report containing measurement information of at least one cell of the plurality of cells from a mobile radio communication device;
    a configuration information transmitter configured to transmit to the at least one cell of the plurality of cells configuration information of the mobile radio communication device based on the received measurement report; wherein the configuration information transmitter is configured to transmit a confirmation of receipt of the measurement report to the mobile radio communication device; and wherein the configuration information transmitter is further configured to exclude at least one cell from the plurality of cells from reestablishing a connection with the mobile radio communication device when the measurement information of the at least one cell is not confirmed by the mobile radio communication network; and
    a configuration indication transmitter configured to transmit to the mobile radio communication device an indication indicating that the mobile radio communication network has transmitted configuration information of the mobile radio communication device to the at least one cell.

17. The mobile radio communication network of claim 16, wherein the indication comprises at least one of an identifier of the second cell, a frequency to be used for reestablishment attempts, an indication of whether inter-cell or inter-frequency reestablishments are possible or an indication of whether inter-cell or inter-frequency reestablishments are possible.

18. The mobile radio communication network of claim 16, wherein the second cell comprises the configuration indication transmitter.

19. The mobile radio communication network of claim 18, wherein the configuration indication transmitter is further configured to transmit the indication to a plurality of mobile radio communication devices.

20. The mobile radio communication network of claim 16, wherein the configuration information comprises a context of the mobile radio communication device.

21. A method for controlling a mobile radio communication network, the method comprising:
    receiving a measurement report containing measurement information of at least one cell of a plurality of cells at a first cell of the mobile radio communication network from a mobile radio communication device;
    transmitting configuration information of the mobile radio communication device to the at least one cell of the plurality of cells based on the received measurement report;
    transmitting a confirmation of receipt of the measurement report to the mobile radio communication device;
    excluding at least one cell from the plurality of cells from reestablishing a connection with the mobile radio communication device when the measurement information of the at least one cell is not confirmed by the mobile radio communication network; and
    transmitting an indication to the mobile radio communication device that the mobile radio communication network has transmitted configuration information of the mobile radio communication device to the at least one cell.

22. The method of claim 21, wherein the indication comprises at least one of an identifier of the measured cell, a frequency to be used for reestablishment attempts, an indication of whether intra-cell or intra-frequency reestablishments are possible or an indication of whether inter-cell or inter-frequency reestablishments are possible.

* * * * *